(12) United States Patent
Houraiya

(10) Patent No.: US 11,052,862 B2
(45) Date of Patent: Jul. 6, 2021

(54) AIR BAG BASE CLOTH AND AIR BAG

(71) Applicant: SEIREN CO., LTD., Fukui (JP)

(72) Inventor: Tsuyoshi Houraiya, Fukui (JP)

(73) Assignee: SEIREN CO., LTD., Fukui (JP)

( * ) Notice: Subject to any disclaimer, the term of this patent is extended or adjusted under 35 U.S.C. 154(b) by 6 days.

(21) Appl. No.: 16/096,833

(22) PCT Filed: Apr. 25, 2017

(86) PCT No.: PCT/JP2017/016398
§ 371 (c)(1),
(2) Date: Dec. 4, 2018

(87) PCT Pub. No.: WO2017/188262
PCT Pub. Date: Nov. 2, 2017

(65) Prior Publication Data
US 2019/0126884 A1    May 2, 2019

(30) Foreign Application Priority Data
Apr. 28, 2016  (JP) .............................. JP2016-089979

(51) Int. Cl.
*B60R 21/235* (2006.01)
*D06M 15/643* (2006.01)
(Continued)

(52) U.S. Cl.
CPC .............. *B60R 21/235* (2013.01); *D04B 1/00* (2013.01); *D04B 1/16* (2013.01); *D04B 1/22* (2013.01);
(Continued)

(58) Field of Classification Search
CPC ........... B60R 2021/23514; B60R 2021/23519; B60R 2021/23576; B60R 21/235; D06M 15/643
See application file for complete search history.

(56) References Cited

U.S. PATENT DOCUMENTS 5,046,759 A * 9/1991 Enniss .................. B60R 21/235
280/743.1
6,328,334 B1 * 12/2001 Kanuma ............... B60R 21/232
280/730.2
(Continued)

FOREIGN PATENT DOCUMENTS

JP          10-95293 A      4/1998
JP       2002-173825 A      6/2002
(Continued)

OTHER PUBLICATIONS

International Search Report, issued in PCT/JP2017/015398, dated Jul. 25, 2017.
(Continued)

*Primary Examiner* — Arti Singh-Pandey
(74) *Attorney, Agent, or Firm* — Birch, Stewart, Kolasch & Birch, LLP

(57) ABSTRACT

Provided is an air bag base cloth constituted by a composite material obtained by coating fabric made of synthetic fibers with a synthetic resin. The average value of the 100% modulus in the warp direction of the fabric texture included in the composite material and the 100% modulus in the weft direction of the fabric texture included in the composite material is 50 N/cm or less. The 100% elongation recovery rate is 95% or more. The 100% elongation load air permeability is 0.1 L/cm$^2$·min or less both before and after thermal treatment at 100° C.

5 Claims, 3 Drawing Sheets

(51) Int. Cl.
*D04B 1/00* (2006.01)
*D04B 1/16* (2006.01)
*D04B 1/22* (2006.01)

(52) U.S. Cl.
CPC . *D06M 15/643* (2013.01); *B60R 2021/23514* (2013.01); *B60R 2021/23519* (2013.01); *B60R 2021/23576* (2013.01)

(56) References Cited

U.S. PATENT DOCUMENTS

| | | | |
|---|---|---|---|
| 7,179,762 B1 * | 2/2007 | Beasley, Jr. | B60R 21/235 139/408 |
| 7,537,238 B2 * | 5/2009 | Kanuma | B60R 21/232 280/728.1 |
| 2002/0020992 A1 * | 2/2002 | Kanuma | B60R 21/232 280/730.2 |
| 2005/0161921 A1 | 7/2005 | Higuchi | |
| 2006/0019561 A1 | 1/2006 | Schindzielorz et al. | |

FOREIGN PATENT DOCUMENTS

| | | |
|---|---|---|
| JP | 2002-363835 A | 12/2002 |
| JP | 2003-48505 A | 2/2003 |
| JP | 2006-176074 A | 7/2006 |
| JP | 2011-73587 A | 4/2011 |

OTHER PUBLICATIONS

European Patent Office Communication issued in the corresponding European Patent Application No. 17789544.8 dated Sep. 30, 2019.

* cited by examiner

AIR BAG BASE CLOTH AND AIR BAG

TECHNICAL FIELD

The present invention relates to an air bag that is commonly installed in vehicles as a safety device for occupant protection that protects an occupant from impact when a vehicle is in a collision, and a base cloth that is used in an air bag.

BACKGROUND ART

In recent years, functions for vehicle safety have diversified. A pre-crash safety system that typically operates an automatic brake to prevent collision or reduce impact upon collision can be considered as a representation of such diversification.

Similarly, properties and functions required for an air bag have diversified, and an air bag for a pre-crash safety system as described above is also proposed. The air bag for a pre-crash safety system is preliminarily inflated based on a collision prediction for the purpose of enhancing safety during collision. Therefore, when a collision is avoided after preliminary inflation, the air bag for a pre-crash safety system is required to return to a pre-filtration state. At that time, the air bag for a pre-crash safety system is inflated to a sufficient size (volume) that is suitable for the purpose of enhancing safety during preliminary inflation but is required to be compactly stored when not inflated.

The premise is that preliminary inflation is repeated during driving, and therefore, it is required that the inflated shape does not change even when inflation is repeated. Furthermore, an inflator using explosives, which is a means for deploying a conventional air bag, cannot be used as a preliminary inflation means, and therefore, the air bag for a pre-crash safety system is required to be sufficiently inflated even by a gentle inflation means such as a means using compressed air.

In addition, it is required that inflation properties such as those described above are obtained even after the air bag has been exposed to outside air or heat produced by an engine for a long period of time.

In order to satisfy such requirements, for example, Patent Literature 1 proposes an air bag apparatus that can be preliminarily inflated based on a collision prediction, can be completely inflated by being further inflated from the preliminary inflation state when collision is detected, and can return to the original state upon the preliminary inflation being canceled when collision is not detected. Patent Literature 2 discloses a method with which an air bag provided with elasticity and airtightness can be easily produced by forming the air bag into a desired shape without joint portions through knitting and by applying an elastic coating.

CITATION LIST

Patent Literature

Patent Literature 1: JP 2011-73587A
Patent Literature 2: JP H10-95293A

SUMMARY OF INVENTION

Technical Problem

However, it cannot be said that the air bag disclosed in Patent Literature 1 has sufficient thermal resistance in an environment where the air bag is exposed to outside air or heat produced by an engine for a long period of time. Therefore, there is a possibility that the inflated shape is unstable when the air bag is repeatedly used for a long period of time. Moreover, Patent Literature 2 states that the air bag disclosed therein has elasticity, but it cannot be said that the inflation properties and thermal durability is sufficient.

It is an object of the present invention to provide an air bag base cloth capable of being used to provide an air bag that can be properly inflated by a gentle inflation means other than an inflator, barely changes in its dimensions even when being repeatedly inflated, and has high thermal durability.

Solution to Problem

That is, an air bag base cloth of the present invention comprising a composite material, wherein the composite material includes at least a fabric made of synthetic fibers, and a synthetic resin with which at least one surface of the fabric is coated, an average value of a 100% modulus in a warp direction of the fabric and a 100% modulus in a weft direction of the fabric is 50 N/cm or less, a 100% elongation recovery rate is 95% or more, and a 100% elongation load air permeability is 0.1 L/cm$^2$·min or less both before and after thermal treatment at 100° C.

In the above-mentioned air bag base cloth, it is preferable that the fabric is formed of a multi-component yarn including polyester-based fibers.

In the above-mentioned air bag base cloths, it is preferable that the synthetic resin is a silicone resin.

In the above-mentioned air bag base cloths, the rupture elongation of the synthetic resin can be set to 500% or more.

In the above-mentioned air bag base cloths, the fineness of the synthetic fibers can be set to 84 dtex or more.

A first air bag according to the present invention includes at least one of the above-described air bag base cloths.

A second air bag according to the present invention is an air bag configured to be preliminarily inflated based on a collision prediction prior to inflation upon collision, the air bag including the first and second air bag cloths being constituted by any of the above-described air bag base cloths, wherein both of the air bag base cloths are layered such that surfaces of the air bag base cloths that are coated with the synthetic resin face each other, and are sewn together.

Advantageous Effects of the Invention

With the present invention, it is possible to provide an air bag base cloth that can be used to provide an air bag that can be properly inflated by a gentle inflation means other than an inflator, barely changes in its dimensions even when repeatedly inflated, and has high thermal durability.

DESCRIPTION OF EMBODIMENTS

Figure 1:
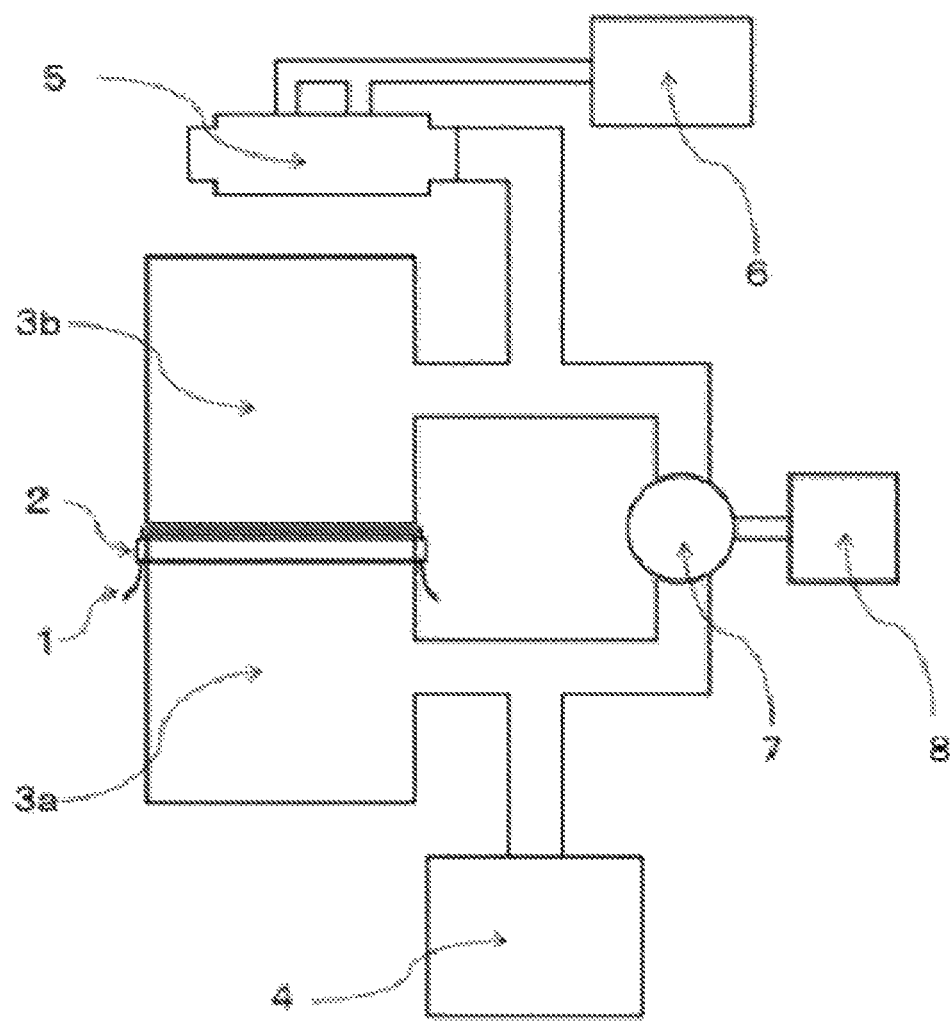
FIG. 1 is a schematic view of a greige air permeability measurement apparatus used in examples.

1. Outline of Air Bag Base Cloth

An air bag base cloth is constituted by a composite material including at least a fabric made of synthetic fibers and a synthetic resin with which the fabric is coated. The average value of the 100% modulus in a warp direction of the fabric texture included in the composite material and the 100% modulus in a weft direction of the texture of the fabric is 50 N/cm or less. In addition, the 100% elongation recovery rate of this composite material measured using a prescribed method is 95% or more. Furthermore, the air permeability of this composite material under a differential pressure of 20 kPa after applying a 100% elongation load to the composite material, namely the 100% elongation load air permeability, is 0.1 L/cm$^2$·min or less both before and after the composite material undergoes thermal treatment at a temperature of 100° C. for 1000 hours. Hereinafter, the physical properties of the fabric, synthetic resin, and composite material will be described in detail.

2. Fabric

The synthetic fibers included in the fabric are selected from the group consisting of aliphatic polyamide-based fibers such as nylon 6 and nylon 66; polyester-based fibers such as polyethylene terephthalate, polytrimethylene terephthalate, polybutylene terephthalate, and polyethylene naphthalate; ultramacromolecular polyolefin-based fibers; chlorine-containing fibers such as vinylidene and polyvinyl chloride; fluorine-containing fibers including polytetrafluoroethylene; polyacetal-based fibers; polysulfone-based fibers; polyphenylene sulfide-based fibers (PPS); polyetheretherketone-based fibers (PEEK); wholly aromatic polyamide-based fibers; wholly aromatic polyester-based fibers; polyimide-based fibers; polyetherimide-based fibers; poly-p-phenylene benzbisoxazole-based fibers (PBC); vinylon-based fibers; acryl-based fibers; cellulose-based fibers; silicon carbide-based fibers; alumina-based fibers; glass-based fibers; carbon-based fibers; and steel-based fibers.

Examples of the yarn include a hard twist yarn including one or more types of fibers selected from the above-mentioned fiber group, a multi-component yarn including two or more types of fibers selected from the above-mentioned fiber group, and a conjugate yarn including one or more types of fibers selected from the above-mentioned fiber group and elastic fibers such as polyurethane fibers. In particular, the multi-component yarn including two or more types of fibers selected from the above-mentioned fiber group, or the conjugate yarn including one or more types of fibers selected from the above-mentioned fiber group and elastic fibers such as polyurethane fibers is preferable due to its high elasticity. A multi-component yarn including polyester-based fibers is particularly preferable from the viewpoint of versatility and thermal durability. It should be noted that the term "multi-component yarn" used in this specification refers to a yarn obtained by combining two or more types of fibers at a spinning step, and the multi-component yarn has high elasticity because it is significantly crimped due to the difference between the contraction ratios of the fibers included in the yarn.

The synthetic fibers included in the fabric preferably have a fineness of 84 dtex or more, more preferably 85 dtex or more, even more preferably 88 dtex or more, and particularly preferably 90 dtex or more. When the fineness is 84 dtex or more, the fabric can withstand a load applied during inflation.

It is sufficient that the fabric texture is selected from woven textures such as a plain weave, a mat weave (basket weave), a check weave (rip-stop weave), a twill weave, a rib weave, a leno weave, and a mock leno weave, knitted textures such as circular knitting, tricot knitting, and raschel knitting, and composite textures thereof. In particular, circular knitting is preferable because the texture has excellent elasticity.

3. Synthetic Resin

It is sufficient that the synthetic resin with which the fabric is coated is selected from resins that have elasticity such as silicone resin, polyurethane resin, and rubber-based resin. In particular, the silicone resin is preferable from the viewpoint of thermal durability. At least one of the surfaces of the fabric is coated with the synthetic resin.

The rupture elongation of the synthetic resin is measured and determined in conformity with the tensile test (elongation at break) of JIS K 6249 15. The rupture elongation is preferably 500% or more and more preferably 1000% or more. When the rupture elongation is 500% or more, the elasticity of the composite material is not inhibited, and an air bag with excellent inflation properties is thus obtained.

Examples of the coating method using the synthetic resin include coating (e.g., knife coating, kiss coating, reverse coating, comma coating, slot-die coating, and rip coating), immersion, printing (e.g., screen printing, roll printing, rotary printing, and gravure printing), transfer, lamination (e.g., wet lamination and dry lamination), and spraying using a spray. In particular, the lamination method is preferable because even a fabric that has high elasticity can be stably coated.

4. Modulus of Composite Material

Regarding the 100% modulus of the composite material, the average value of the 100% modulus in a warp direction of the fabric texture included in the composite material and the 100% modulus in a weft direction of the texture of the fabric is 50 N/cm or less. When the average value is 50 N/cm, sufficient elongation is exhibited even when little stress is applied, and therefore, an air bag can be sufficiently inflated using a relatively gentle inflation means such as inflation with low-pressure compressed air that is selected for preliminary inflation where an inflator utilizing the explosion of explosives cannot be used, thus making it possible to design the air bag such that its pre-inflation size is small.

5. 100% Elongation Recovery Rate of Composite Material

The 100% elongation recovery rates in the warp direction and the weft direction of the composite material are both 95% or more. It should be noted that the "100% elongation recovery rate" refers to an elongation recovery rate when a 100% elongation load is repeatedly applied ten times by repeating an operation in which a 100% elongation load application state is kept for 1 minute, then the load is removed and a stationary state is kept for 10 minutes, and thereafter a load is applied again. The 100% elongation recovery rate is preferably 98% or more. When the elongation recovery rate is 95% or more, an air bag can exhibit stable behavior even in a case where the air bag is repeatedly inflated.

6. 100% Elongation Load Air Permeability of Composite Material

The 100% elongation load air permeability of the composite material is 0.1 L/cm$^2$ min or less both before and after the composite material undergoes thermal treatment at 100° C. for 1000 hours. It should be noted that, in this application, the "100% elongation load air permeability" refers to the air permeability under a differential pressure of 20 kPa after a 100% elongation load is applied. When the 100% elongation load air permeability is 0.1 L/cm²·min or less before and after thermal treatment performed at 100° C. for 1000 hours, the internal pressure can be maintained even after the elongation, namely after the bag has been inflated once. When the 100% elongation load air permeability is 0.1 L/cm²·min or less after the thermal treatment, a stable inflated shape can be obtained even in a case where a vehicle is used for a long period of time.

7. Outline of Air Bag

An air bag of the present invention can be obtained by joining at least one base cloth obtained by cutting the above-mentioned composite material into a desired shape (referred to simply as "base cloth" hereinafter). The air bag includes one or more base cloths. It is preferable that all of the base cloths included in the air bag are formed of the above-mentioned composite material. It is sufficient that the specifications, shape, and volume of the airbag of the present invention are selected in accordance with the site at which the air bag is to be disposed, the application, storage space, the ability to absorb occupant impact, the output of the inflator, and the like.

For example, two of the above-mentioned base cloths are layered such that the surfaces to which the synthetic resin was applied face each other. At this time, joining of the above-mentioned base cloths, joining of a base cloth and a reinforcement cloth or a hanging string, and fixing of other cut base cloth are performed mainly through sewing, but it is possible to use partial adhesion, welding, or the like in combination, or use a joining method using weaving or knitting as long as the air bag satisfies the robustness, impact resistance at the time of deployment, the ability to absorb occupant impact, and the like to function as an air bag.

It is sufficient that cut base cloths are sewn together using a sewing method that is applied to a normal air bag, such as lock stitching, multi-thread chain stitching, one side down stitching, looping, safety stitching, zigzag stitching, flattened stitching, or the like. Also, it is sufficient that the fineness of the sewing thread is 700 dtex (corresponding to #20) to 2800 dtex (corresponding to #0), and the stitch count is 2 to 10 stitches/cm. If stitch lines in a plurality of rows are required, it is sufficient that a multi-needle sewing machine with the distance between stitch lines being about 2 ram to 8 mm is used, but if the distance of a sewing portion is not long, sewing may be performed using a single-needle sewing machine a plurality of times. If an air bag body is formed of a plurality of base cloths, a plurality of base cloths may be sewn together in a stacked state, or sewn together one by one.

It is sufficient that the sewing thread used for sewing is selected as appropriate from threads that are generally called synthetic threads and threads that are used as industrial sewing threads. Examples thereof include nylon 6 threads, nylon 66 threads, nylon 46 threads, polyester threads, macromolecular polyolefin threads, fluorine-containing threads, vinylon threads, aramid threads, carbon threads, glass threads, and steel threads, and any of a spun yarn, a filament twisted yarn, or a processed filament resin yarn may be used.

Furthermore, in order to prevent gas leaking from stitches in outer circumferential sewing portions or the like, a sealing material, an adhesive, an adhering material, or the like may be applied to, sprayed onto, or stacked on upper portions and/or lower portions of stitches, gaps between stitches, a seam margin, or the like.

The air bag of the present invention can be applied to applications in passenger cars, commercial vehicles, buses, motorcycles, and the like as various bags for occupant protection, such as side bags and center bags for front-on collision protection and side-on collision protection of a driver/passenger seat, headrest bags for rear seat occupant protection (front-on collision and rear-on collision) and headrest bags for rear-on collision protection, knee bags and foot bags for leg and foot protection, mini bags for infant protection (child seats), bag bodies for an air belt, and bags for pedestrian protection, and furthermore, as long as the function requirements are satisfied, the air bag of the present invention can also be applied in multiple applications such as ships, railroad trains, electric railcars, aircraft, and amusement park facilities.

EXAMPLES

Hereinafter, the present invention will be more specifically described based on examples, but the present invention is not limited to these examples. It should be noted that methods for evaluating the properties and performance of the composite material that were performed in the examples will be described below.

100% Modulus

In conformity with method A in JIS L 1096 8.14.1, the produced composite material was cut to a size with a length of 300 mm and a width of 50 mm such that the longitudinal direction of the sample was parallel with the warp direction of the fabric texture included in the composite material. Next, this sample was set to extend in the warp direction of the fabric texture included in the composite material in Autograph (manufactured by SHIMADZU CORPORATION, AG-IS MO-type) with the distance between grips being 200 mm. Subsequently, this sample was pulled at a speed of 200 mm/min until it split, and then a graph in which the vertical axis indicates stress (N/cm) and the horizontal axis indicates the elongation (%) was created based on the data obtained from the measurement. The stress at the time when the elongation was 100% of the original length was read from the created graph, and the read value was taken as a 100% modulus in the warp direction. A sample obtained by cutting the composite material such that the longitudinal direction of the sample was parallel with the weft direction of the fabric texture included in the composite material was also subjected to the same measurement, and a graph was created. A 100% modulus in the weft direction was obtained from this graph.

100% Elongation Recovery Rate

In order to obtain a sample for measurement of a 100% elongation recovery rate, the produced composite material was cut to a size with a length of 300 mm and a width of 50 mm such that the longitudinal direction of a sample was parallel with the warp direction of the fabric texture included in the composite material. Next, two reference lines were drawn with a gap of 100 mm therebetween, at the center in the longitudinal direction of this sample. The sample on which the reference lines were drawn was set in Autograph (manufactured by SHIMADZU CORPORATION, AG-IS MO-type) with the distance between the grips being 200 mm. Subsequently, the sample was pulled at a speed of 200 mm/min until the distance between the grips was 400 mm, and held for 1 minute in a state in which the distance between the grips was 400 mm. Thereafter, the load was removed, and the sample was left to stand for 10 minutes. The operation in which the sample was pulled and left to stand was repeated 10 times, and then the distance (mm) between the reference lines was measured and recorded. The 100% elongation recovery rate was calculated based on the following equation. A sample obtained by cutting the composite material such that the longitudinal direction of the sample was parallel with the weft direction of the fabric texture included in the composite material was also subjected to the same measurement.

100% elongation recovery rate (%)=(1−(distance between reference lines after 10 operations−100)/100)×100

100% Elongation Load Air Permeability

In order to obtain a sample for measurement of 100% elongation load air permeability, the produced composite material was cut to a size with a width of 200 mm and a length of 200 mm such that the longitudinal direction of the sample was parallel with the warp direction of the fabric texture included in the composite material. Next, this sample was set to extend in the warp direction of the fabric texture included in the composite material in Autograph (manufactured by SHIMADZU CORPORATION, AG-IS MO-type) with the distance between the grips being 100 mm. Subsequently, the sample was pulled at a speed of 200 mm/min until the distance between the grips was 200 mm, and held for 1 minute in a state in which the distance between the grips was 200 mm. Thereafter, the load was removed, and the sample was left to stand for 10 minutes. Then, the sample was set to extend in the weft direction of the fabric texture included in the composite material. The same elongation load was applied to the sample, and then the sample was left to stand for 10 minutes. The air permeability of the sample to which the elongation load had been applied was measured under a differential pressure of 20 kPa using a greige air permeability measurement apparatus (manufactured by Kyotoseiko Co., Ltd.) shown in FIG. 1.

Specifically, as shown in FIG. 1, a sample 1 was fixed, using a ring-shaped fastener 2, to a tubular first clamp 3a that had an inner diameter of 50 mm connected to a pressure device 4, and was held between the first clamp 3a and a tubular second clamp 3b that had an inner diameter of 50 mm connected to the laminar flow tube 5 (LF2-100L, manufactured by Cosmo Seiki Co., Ltd.). Thereafter, pressure was applied to Sample 1 using the pressure device 4 from the first clamp 3a side, and a pressure adjustment valve 7 was operated such that a pressure gauge 8 (DP-330BA, manufactured by Cosmo Seiki Co., Ltd.) displayed 20 kPa. The flow rate of air passing through the sample in the above-mentioned state was detected using a flowmeter 6 (DF2810P, manufactured by Cosmo Seiki Co., Ltd.) connected to the laminar flow tube 5, and the detected value was taken as the air flow rate under a differential pressure of 20 kPa. Also, regarding a sample stored in a constant temperature oven in which the temperature was controlled to be 100° C. for 1000 hours, the air permeability was evaluated in the same manner after the elongation load was applied.

Method for Producing Air Bag for Evaluation

Figure 2:
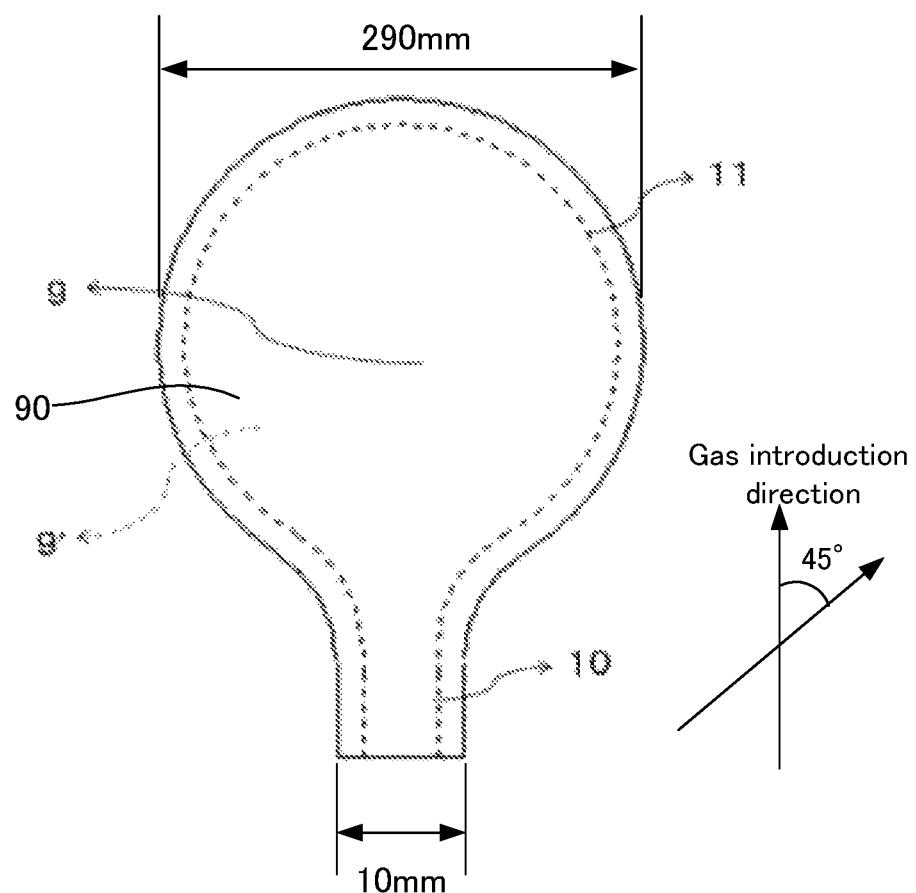
FIG. 2 is a front view showing an air bag for evaluation used in the examples.

In examples and comparative examples, which will be described later, an air bag base cloth that was a composite material obtained by coating one side of a fabric with a synthetic resin was produced. The produced composite material was cut to provide two parts 9 and 9' having the shape shown in FIG. 2. Each of the parts 9 and 9' included a circular main body portion 90 and a gas introduction portion 10 extending in the radial direction from one end of the main body portion 90, and the main body portion 90 and the gas introduction portion 10 were formed integrally. The outer diameter of the main body portion 90 was 290 mm, and the width of the gas introduction portion 10 was 100 mm. The part 9 was cut such that the gas introduction direction was parallel to the fabric texture included in the composite material, and the part 9' was cut such that the gas introduction portion 10 intersected the fabric texture included in the composite material at an angle of 45°. A silicone-based sealing material was applied, along a dotted line 11, to the surface of the part 9 to which a synthetic resin was to be applied, and the part 9' was layered thereon such that the surfaces to which a synthetic resin was applied faced each other. Thereafter, the parts 9 and 9' were crimped such that the thickness of the sealing material was 1 mm, and then were left to stand at 20° C. for 24 hours to cure the sealing material. After the sealing material was cured, the parts 9 and 9' were sewn together at 40 stitches/10 cm along the dotted line 11, namely the center of the sealing material, using a 1880-dtex sewing thread made of nylon 66. An air bag for evaluation was thus obtained.

Evaluation of Inflation Degree of Bag

A base cloth was produced by coating, at 25 g/m², a plain woven fabric made of a 470-dtex nylon 66 yarn in which both the warp density and the weft density were 46 threads/2.54 cm with a silicone resin that mainly contained polydimethylsilicone with a rupture elongation of 300%. An air bag was produced using the base cloths using the same method as the method for producing an air bag for evaluation. The thus obtained air bag was taken as a reference bag.

Figure 3:
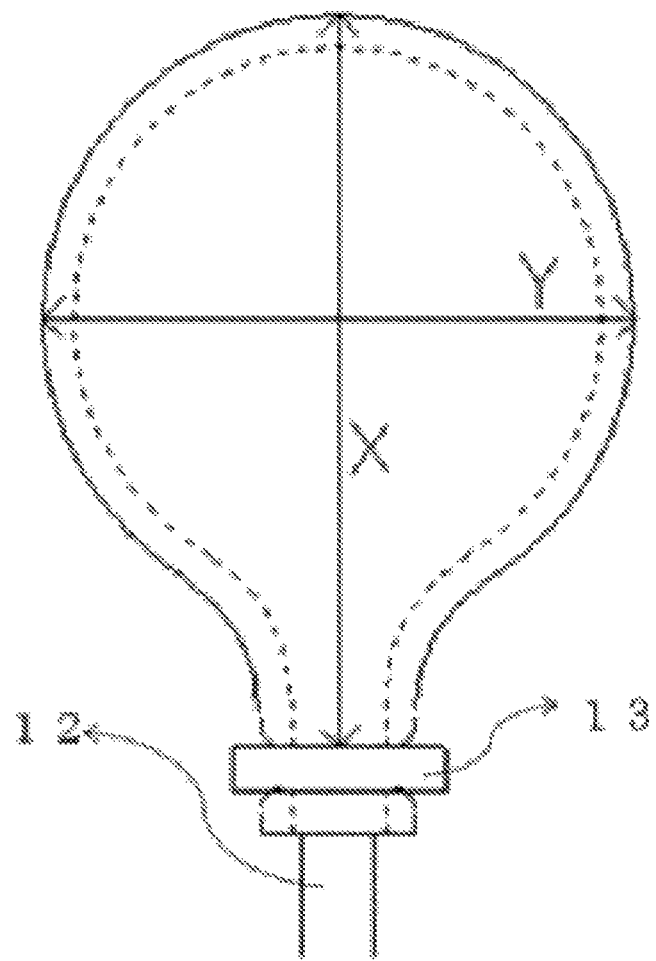
FIG. 3 is an explanatory diagram showing an air bag fixation state during an inflation degree evaluation test of the examples.

This reference bag was an ordinary air bag that is not preliminarily deployed but is deployed upon collision, and was made of a raw fabric without high elongation. Then, as shown in FIG. 3, the air bag for evaluation and the reference bag were each fixed, using a bag fixation jig 13, to a gas introduction tube 12 connected to a nitrogen gas container. The air bag was inflated by introducing nitrogen gas such that the internal pressure of the air bag was 5 kPa, and was then evaluated by measuring post-inflation dimensions. The length to the bag fixation jig 13 in the axial direction of the gas introduction tube 12 connected directly to the air bag was taken as X (the length of the bag), the length in a direction orthogonal to X and parallel with the surface of the bag prior to inflation was taken as Y (the width of the bag), and the length in a direction orthogonal to the surface of the bag prior to inflation was taken as Z (the height of the bag), and these lengths (mm) were measured. X, Y, Z were used to determine a volume index obtained using the following equation. Such an inflation degree can be used to evaluate the inflation using a gentle inflation means other than an inflator, for example.

Volume index=X×Y×Z/10000

Cases where the inflation degree, which is obtained by dividing the volume index of the air bag for evaluation by the volume index (696) of the reference bag, was 2.0 or more were evaluated as "A", and cases where the inflation degree was less than 2.0 were evaluated as "B".

Evaluation of Dimensional Change Ratio Between Trials

The air bag was fixed using the same method as in "Evaluation of inflation degree". The air bag was inflated by introducing nitrogen gas such that the internal pressure of the air bag was 5 kPa, and was then evaluated by measuring post-inflation dimensions. As shown in FIG. 3, the axial direction of the gas introduction tube 12 connected directly to the air bag was taken as X (the length of the bag), the direction orthogonal to X and parallel with the surface of the bag prior to inflation was taken as Y (the width of the bag), and the direction orthogonal to the surface of the bag prior to inflation was taken as Z (the height of the bag), and these lengths (mm) were measured. After the measurement, the nitrogen gas in the bag was discharged once. Thereafter, nitrogen gas was introduced again, and a second measurement was performed. A third measurement was performed in the same manner. The results of the first measurement were taken as X1, Y1, and Z1, the results of the second measurement were taken as X2, Y2, and Z2, and the results of the third measurement were taken as X3, Y3, and Z3. The following equation was used to calculate the average of the respective dimensional change ratios in the X, Y, and Z directions using the values from the first and second trials, and calculate the average of the respective dimensional change ratios in the X, Y, and Z directions using the values from the first and third trials. Such dimensional change ratios between trials can be used to evaluate the dimensional change in the case where the air bag is repeatedly inflated.

Average of dimensional change ratios between trials=$(Xn/X1+Yn/Y1+Zn/Z1)/3\times100$ ($n$ represents the number of inflation trials)

Also, the average of the dimensional change ratios of the air bag for evaluation after thermal treatment was calculated using the same method. Cases where the average of the dimensional change ratios was 95% or more and 105% or less were evaluated as "A", and cases other than these cases were evaluated as "B".

Evaluation of Dimensional Change Ratio Between Before and after Thermal Treatment The values from the first trial of the bag prior to the thermal treatment and the values from the first trial of the bag after the thermal treatment that were measured in "Evaluation of dimensional change ratio between trials" were used to calculate the average of the dimensional change ratios between before and after the thermal treatment using the following equation. The dimensional change ratio between before and after the thermal treatment can be used to evaluate the thermal durability of the air bag. Cases where the average of the dimensional change ratios was 95% or more and 105% or less were evaluated as "A", and cases other than these cases were evaluated as "B".

Average of dimensional change ratios between before and after thermal treatment=($X1$ after thermal treatment/$X1$ before thermal treatment+$Y1$ after thermal treatment/$Y1$ before thermal treatment+$Z1$ after thermal treatment/$Z1$ before thermal treatment)/$3\times100$

Example 1

A circular knitted fabric was knitted using a 110-dtex multi-component yarn made of polyethylene terephthalate and polytrimethylene terephthalate. Thereafter, a silicone resin that mainly contained polydimethylsiloxane with a rupture elongation of 1500% was applied, to a thickness of 250 microns, to one surface of the fabric through wet lamination. A composite material was thus obtained. As shown in Table 1, the obtained composite material had an average of 100% moduli in the warp and weft directions of 11 N/cm, a 100% elongation recovery rate in the warp direction of 98%, a 100% elongation recovery rate in the weft direction of 99%, an initial 100% elongation load air permeability of 0.02 L/cm$^2$·min, and a 100% elongation load air permeability post thermal treatment of 0.02 L/cm$^2$·min. An air bag for evaluation was produced using this composite material as described above, and the inflation test was performed. As shown in Table 2, the test results were as follows: the inflation degree was 3.8, the average of the initial dimensional change ratios between the first and second trials was 101%, and the average of the initial dimensional change ratios between the first and third trials was 102%. In addition, the average of the dimensional change ratios between the first and second trials after the thermal treatment was 100%, the average of the dimensional change ratios between the first and third trials after the thermal treatment was 100%, and the average of the dimensional change ratios between before and after the thermal treatment was 99%. Therefore, the air bag according to Example 1 exhibited stable inflation behavior, and could also be applied to an application in a pre-crash safety system.

Example 2

A circular knitted fabric was knitted using a 330-dtex multi-component yarn made of polyethylene terephthalate and polytrimethylene terephthalate. Thereafter, a silicone resin that mainly contained polydimethylsiloxane with a rupture elongation of 1500% was applied, to a thickness of 250 microns, to one surface of the fabric through wet lamination. A composite material was thus obtained. As shown in Table 1, the obtained composite material had an average of 100% moduli in the warp and weft directions of 46 N/cm, a 100% elongation recovery rate in the warp direction of 96%, a 100% elongation recovery rate in the weft direction of 95%, an initial 100% elongation load air permeability of 0.04 L/cm$^2$·min, and a 100% elongation load air permeability post thermal treatment of 0.10 L/cm$^2$·min. An air bag for evaluation was produced using this composite material as described above, and the inflation test was performed. Table 2 shows the results. The air bag according to Example 2 exhibited stable inflation behavior, and could also be applied to an application in a pre-crash safety system.

Comparative Example 1

A circular knitted fabric was knitted using a 110-dtex multi-component yarn made of polyethylene terephthalate and polytrimethylene terephthalate. Thereafter, a silicone resin that mainly contained polydimethylsiloxane with a rupture elongation of 300% was applied, to a thickness of 250 microns, to one surface of the fabric through wet lamination. A composite material was thus obtained. As shown in Table 1, the obtained composite material had an average of 100% moduli in the warp and weft directions of 73 N/cm, a 100% elongation recovery rate in the warp direction of 95%, a 100% elongation recovery rate in the weft direction of 96%, an initial 100% elongation load air permeability of 0.05 L/cm$^2$·min, and a 100% elongation load air permeability post thermal treatment of 0.04 L/cm$^2$·min. It was thought that the base cloth according to Comparative Example 1 had a higher 100% modulus since it was coated with a synthetic resin with a low rupture elongation. An air bag for evaluation was produced using this composite material as described above, and the inflation test was performed. Table 2 shows the results. Regarding the air bag according to Comparative Example 1, the dimensional change was not problematic, but the inflation degree was as low as 1.8. The air bag was thus not suitable for an application in a pre-crash safety system.

Comparative Example 2

A circular knitted fabric was knitted using a 84-dtex yarn made of polyethylene terephthalate. Thereafter, a silicone resin that mainly contained polydimethylsiloxane with a rupture elongation of 1500% was applied, to a thickness of 250 microns, to one surface of the fabric through wet lamination. A composite material was thus obtained. As shown in Table 1, the obtained composite material had an average of 100% moduli in the warp and weft directions of 40 N/cm, a 100% elongation recovery rate in the warp direction of 82%, a 100% elongation recovery rate in the weft direction of 84%, an initial 100% elongation load air permeability of 0.08 L/cm$^2$·min, and a 100% elongation load air permeability post thermal treatment of 0.11 L/cm$^2$·min. It was thought that the base cloth according to Comparative Example 2 had a lower 100% elongation recovery rate since a yarn made of polyethylene terephthalate was used. An air bag for evaluation was produced using this composite material as described above, and the inflation test was performed. Table 2 shows the results. Regarding the air bag according to Comparative Example 2, the average of the initial dimensional change ratios between trials was as high as 106% to 107%, and the average of the dimensional change ratios between trials after the thermal treatment was as high as 106%. The air bag was thus not suitable for an application in a pre-crash safety system.

Comparative Example 3

A circular knitted fabric was knitted using a 110-dtex multi-component yarn made of polyethylene terephthalate and polytrimethylene terephthalate. Thereafter, polycarbonate-based polyurethane resin with a rupture elongation of 800% was applied, to a thickness of 100 microns, to one surface of the fabric through wet lamination. A composite material was thus obtained. As shown in Table 1, the obtained composite material had an average of 100% moduli in the warp and weft directions of 13 N/cm, a 100% elongation recovery rate in the warp direction of 97%, a 100% elongation recovery rate in the weft direction of 98%, and an initial 100% elongation load air permeability of 0.03 L/cm$^2$·min. The 100% elongation load air permeability post thermal treatment could not be measured due to excessive air flow. It was thought that this was because the synthetic resin was constituted by polyurethane resin, and this layer deteriorated due to thermal treatment, resulting in breakage during inflation. An air bag for evaluation was produced using this composite material as described above, and the inflation test was performed. Table 2 shows the results. Regarding the air bag according to Comparative Example 3, the average of the dimensional change ratios between before and after the thermal treatment was as low as 71%. The air bag was not suitable from the viewpoint of the thermal durability.

TABLE 1

| | | | Ex. 1 | Ex. 2 | Comp. Ex. 1 | Comp. Ex. 2 | Comp. Ex. 3 |
|---|---|---|---|---|---|---|---|
| Type of synthetic fibers | | | PET/PTT | PET/PTT | PET/PTT | PET | PET/PTT |
| Fineness of synthetic fibers (dtex) | | | 110 | 330 | 110 | 84 | 110 |
| Fabric texture | | | Circular knitting | Circular knitting | Circular knitting | Circular knitting | Circular knitting |
| Type of synthetic resin | | | Silicone | Silicone | Silicone | Silicone | Polyurethane |
| Rupture elongation of synthetic resin (%) | | | 1500 | 1500 | 300 | 1500 | 800 |
| 100% modulus | N/cm | Warp | 17 | 80 | 110 | 66 | 22 |
| | | Weft | 10 | 12 | 36 | 14 | 4 |
| | | Average | 11 | 46 | 73 | 40 | 13 |
| 100% elongation recovery rate | % | Warp | 98 | 96 | 95 | 82 | 97 |
| | | Weft | 99 | 95 | 96 | 84 | 98 |
| 100% elongation load air permeability | L/cm$^2$·min | Initial | 0.02 | 0.04 | 0.05 | 0.08 | 0.03 |
| | | After heating | 0.02 | 0.10 | 0.04 | 0.11 | Unmeasurable |

TABLE 2

| | | Ex. 1 | Ex. 2 | Comp. Ex. 1 | Comp. Ex. 2 | Comp. Ex. 3 |
|---|---|---|---|---|---|---|
| Inflation degree | — | 3.8 | 2.6 | 1.8 | 2.7 | 3.7 |
| | Evaluation | A | A | B | A | A |
| Dimensions of inflated bag: Initial | mm X1 | 340 | 324 | 277 | 323 | 333 |
| | Y1 | 314 | 279 | 261 | 289 | 317 |
| | Z1 | 247 | 198 | 175 | 204 | 244 |
| | X2 | 341 | 321 | 275 | 340 | 336 |
| | Y2 | 318 | 280 | 263 | 311 | 316 |
| | Z2 | 252 | 201 | 172 | 217 | 245 |
| | X3 | 344 | 322 | 272 | 339 | 334 |
| | Y3 | 319 | 283 | 254 | 313 | 319 |
| | Z3 | 253 | 201 | 171 | 217 | 246 |

TABLE 2-continued

|  |  |  | Ex. 1 | Ex. 2 | Comp. Ex. 1 | Comp. Ex. 2 | Comp. Ex. 3 |
|---|---|---|---|---|---|---|---|
| Average of change ratios between trials: Initial | % | 1 and 2 | 101 | 100 | 99 | 106 | 100 |
|  |  | 1 and 3 | 102 | 101 | 98 | 107 | 101 |
|  | Evaluation |  | A | A | A | B | A |
| Dimensions of inflated bag: After thermal treatment | mm | X1 | 338 | 323 | 269 | 320 | 265 |
|  |  | Y1 | 311 | 278 | 258 | 288 | 219 |
|  |  | Z1 | 245 | 196 | 172 | 202 | 160 |
|  |  | X2 | 339 | 322 | 268 | 342 | 266 |
|  |  | Y2 | 310 | 273 | 258 | 306 | 221 |
|  |  | Z2 | 245 | 192 | 171 | 214 | 158 |
|  |  | X3 | 340 | 318 | 265 | 341 | 267 |
|  |  | Y3 | 309 | 271 | 254 | 308 | 217 |
|  |  | Z3 | 248 | 191 | 169 | 211 | 161 |
| Average of change ratios between trials: After thermal treatment | % | 1 and 2 | 100 | 99 | 100 | 106 | 100 |
|  |  | 1 and 3 | 100 | 98 | 98 | 106 | 100 |
|  | Evaluation |  | A | A | A | B | A |
| Average of change ratios between before and after thermal treatment |  | % | 99 | 99 | 98 | 99 | 71 |
|  | Evaluation |  | A | A | A | A | B |

LIST OF REFERENCE NUMERALS

1 Sample for measurement of air permeability
2 Ring-shaped fastener
3a, 3b Tubular clamp
4 Pressure device
5 Laminar flow tube
6 Flowmeter
7 Pressure adjustment valve
8 Pressure gauge
9, 9' Part
10 Gas introduction portion
11 Sealing material application position
12 Gas introduction tube
13 Bag fixation jig

The invention claimed is:

1. An air bag base cloth comprising:
a composite material, wherein the composite material comprises at least: a circular knitted fabric made of multi-component yarn made of polyethylene terephthalate and polytrimethylene terephthalate fibers; and a synthetic resin with which at least one surface of the fabric is coated; wherein the fineness of the fibers is 84 to 110 dtex, the synthetic resin has a rupture elongation of 500% or more, an average value of a 100% modulus in a warp direction of the fabric and a 100% modulus in a weft direction of the fabric is 50 N/cm or less, a 100% elongation recovery rate is 95% or more, and a 100% elongation load air permeability is 0.1 L/cm²-min or less both before and after thermal treatment at 100° C.

2. The air bag base cloth according to claim 1, wherein the synthetic resin is a silicone resin.

3. An air bag comprising at least one air bag base cloth according to claim 1.

4. An air bag configured to be preliminarily inflated based on a collision prediction prior to inflation upon collision, the air bag comprising: the first and second air bag cloths being constituted by the air bag base cloth according to claim 1, wherein both of the air bag base cloths are layered such that surfaces of the air bag base cloths that are coated with the synthetic resin face each other, and are sewn together.

5. An air bag base cloth comprising:
a composite material, wherein the composite material comprises at least: a circular knitted fabric made of multi-component yarn made of polyethylene terephthalate and polytrimethylene terephthalate fibers; and a synthetic resin, having a rupture elongation of 500% or more, with which at least one surface of the fabric is coated; wherein an average value of a 100% modulus in a warp direction of the fabric and a 100% modulus in a weft direction of the fabric is 50 N/cm or less, a 100% elongation recovery rate is 95% or more, and a 100% elongation load air permeability is 0.1 L/cm²-min or less both before and after thermal treatment at 100° C.

* * * * *